(12) United States Patent
Nimbavikar et al.

(10) Patent No.: US 9,706,053 B1
(45) Date of Patent: Jul. 11, 2017

(54) ALTERING VOICEMAIL GREETINGS BASED ON COMMUNICATION STATE

(71) Applicant: T-Mobile, USA, Inc., Bellevue, WA (US)

(72) Inventors: Gunjan Nimbavikar, Bellevue, WA (US); Chris Roution, Seattle, WA (US)

(73) Assignee: T-Mobile U.S.A., Inc., Bellevue, WA (US)

( * ) Notice: Subject to any disclaimer, the term of this patent is extended or adjusted under 35 U.S.C. 154(b) by 0 days.

(21) Appl. No.: 14/994,785

(22) Filed: Jan. 13, 2016

(51) Int. Cl.
*H04M 11/00* (2006.01)
*H04M 3/533* (2006.01)
*H04W 72/04* (2009.01)
*H04W 4/02* (2009.01)

(52) U.S. Cl.
CPC ....... *H04M 3/53366* (2013.01); *H04W 4/025* (2013.01); *H04W 72/048* (2013.01)

(58) Field of Classification Search
CPC .......................................... H04M 3/533–3/537
USPC .......................................... 455/413; 379/67.1
See application file for complete search history.

(56) References Cited

U.S. PATENT DOCUMENTS

| | | | | |
|---|---|---|---|---|
| 6,690,663 B1* | 2/2004 | Culver | ................ | H04M 7/006 370/352 |
| 8,000,455 B1* | 8/2011 | Van Haaften | ...... | G06Q 30/0267 341/50 |
| 9,100,487 B1* | 8/2015 | Mohiuddin | ....... | H04M 3/53333 |
| 2003/0152201 A1* | 8/2003 | Snelgrove | ............. | H04M 3/533 379/88.22 |
| 2004/0014456 A1* | 1/2004 | Vnnen | .................... | H04W 4/24 455/413 |
| 2005/0089149 A1* | 4/2005 | Elias | ................. | H04M 3/53308 379/88.13 |
| 2005/0101303 A1* | 5/2005 | Pelaez | ............... | H04M 3/53333 455/413 |
| 2005/0271011 A1* | 12/2005 | Alemany | .............. | H04W 36/28 370/331 |
| 2006/0285657 A1* | 12/2006 | Lippke | ................. | H04M 3/493 379/67.1 |
| 2008/0184260 A1* | 7/2008 | Grayson | ................. | H04L 12/66 719/313 |
| 2010/0273443 A1* | 10/2010 | Forutanpour | ........... | H04L 51/02 455/404.1 |
| 2011/0051910 A1* | 3/2011 | Gray | ................... | H04L 12/5815 379/88.22 |
| 2013/0072165 A1* | 3/2013 | Rondeau | ............... | H04M 3/436 455/413 |
| 2014/0370856 A1* | 12/2014 | Strunk | .................... | H04W 4/12 455/413 |

* cited by examiner

*Primary Examiner* — Charles Shedrick
(74) *Attorney, Agent, or Firm* — Han Santos, PLLC; Elliott Y. Chen

(57) ABSTRACT

Techniques are disclosed for recording a voicemail greeting for a user device that is based on the communication state of the device. As depicted, the communication state may be defined as the user device connected with the core network via the cellular network, the user device connected with the voicemail system via Wi-Fi, the user device not being connected with any wireless network, the user device geo-location and the user device being blocked for a period of time. The embodiment allows the user device to update the communication state and record a voicemail greeting via the cellular network or a Wi-Fi signal.

17 Claims, 9 Drawing Sheets

ALTERING VOICEMAIL GREETINGS BASED ON COMMUNICATION STATE

BACKGROUND

With the advent of the smart phone, the ability of a handset to offer more services and information to the user drastically increased. While previously a cell phone handset could be used for placing calls between parties and retrieving voicemails, now one could add software to the phone to retrieve information, pictures and video over the airwaves. In response, cell phone carriers were forced to secure additional bandwidth from federal regulators or explore other options to meet the increased demands on frequency bandwidth.

More recently, to allow cell phone users to use the handset while not encumbering their frequency spectrum, phone carriers have offered handset devices that have the ability to connect to the cell phone system through Wi-Fi networks. This feature greatly enhances the capacity of cell phone networks to sustain more users and the ability to transfer increasing amounts of data to the handset for a greater user experience.

As with the cell phone, the modern voicemail system had its beginnings in the late 1970s and it was only a matter of time before it was incorporated into the mobile phone services. There are many problems with voicemail systems, some of which are well known.

BRIEF DESCRIPTION OF DRAWINGS

The Detailed Description is set forth with reference to the accompanying Figures.

DETAILED DESCRIPTION

Context of Altering Voicemail Greeting Based on State
Overview

Unlike the cell phone, enhancements and development of the voicemail system have been limited. One can leave and retrieve voicemails, but there is need for the voicemail system to have additional features that improve its practicality and enhance the user experience over the various wireless networks. This need extends to adjusting a voicemail greeting based on a communication state of a cell phone. A voicemail greeting is generally a message that a caller hears when he or she makes a call that goes unanswered, and is prompted to leave a voicemail message.

Figure 1:
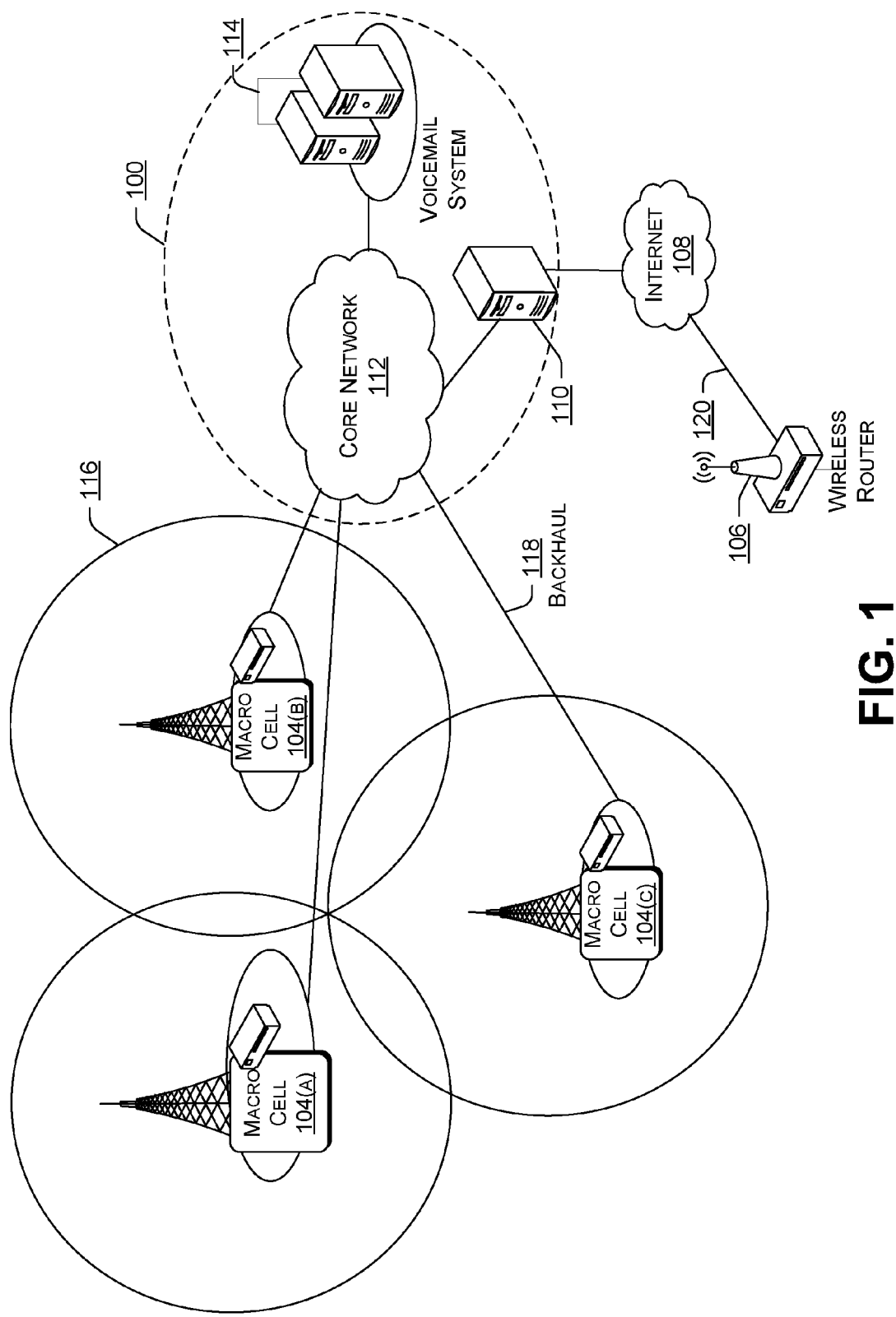
FIG. 1 illustrates example network architecture for implementing a voicemail greeting.

FIG. 1 illustrates example system architecture for implementing a customizable voicemail greeting system. The core network 100 may include cellular towers 104(a), 104(b), 104(c), with a base station, connected to the core network 112, via a corresponding backhaul 118. The cellular towers 104(a), 104(b), 104(c) are responsible for transmitting and receiving data from user devices 102(a), 102(b), 102(c) (sometimes referred to as computing devices, or telephonic communication devices) that are located within the area of coverage 116 for cellular tower 104. The backhaul 118 connections may be implemented via copper cables, fiber optic cables, microwave transceivers, and laser transceivers. User devices 102 may be cellular telephones, smart phones, tablets, computers, or any other device capable of connecting with the core network to transmit and receive voice and data communication.

User devices may also be linked to the core network 100, via a Wireless Fidelity (Wi-Fi) signal distributed by a wireless router 106. In general, Wi-Fi may refer to wireless communications according to a Institute of Electrical and Electronics Engineers (IEEE) 802.11 protocol, such as 802.11(g), 802.11(n), and 802.11(ac). Copper cables or fiber optic cables may achieve connection to the Internet 108, and from the Internet 108 the data and voice communication is transmitted to the core network 112 via an Internet gateway 110.

In general, cellular towers 104 may be considered to use a communications protocol that utilizes licensed spectrum, and wireless router 106 may be considered to be using a communications protocol that utilizes unlicensed spectrum. Licensed spectrum covers long distance, high power radiation emitters, which may include cellular base stations on standards such as Code Division Multiple Access 2000 ("CDMA2000"), Wideband Code Division Multiple Access ("W-CDMA"), High Speed Packet Access Plus ("HSPA+"), and Long Term Evolution ("LTE") base stations. For purposes of this patent application, licensed spectrum refers to any EMF that relates to frequencies whose use is amenable to long distance and/or high power radiation emission, as to be regulated by license by a government.

In contrast, relatively short distance/low power radiation emitters, have less risk of interfering with other user devices. While still regulated, these EMF frequencies are typically not subject to license. For example, in the United States, the Federal Communications Commission ("FCC") presently regulates unlicensed spectrum via Title 47 of the Code of Federal Regulations, Part 15 ("47 CFR 15").

Unlicensed emitters, include Wi-Fi, Bluetooth, cordless phones, and frequency modulation ("FM") bands for used for low-distance coverage encompassing a single business locale, a residence, or shorter. Also contemplated are transmitters which may have longer range capability but whose focus limits diffusion and therefore limits the potential to interfere with other communications. An example may include laser based communications where the laser intensity is sufficiently low not to cause health hazards. For purposes of this patent application, unlicensed spectrum refers to any EMF that relates to frequencies whose use is amenable to low-distance and/or low power radiation emission, as not to be regulated by license by a government.

As the central part of the core network 100, the core network 112 tracks user devices and routes voice and data communication between these devices.

For example, as depicted, a first user device 102(a) that is communicatively linked to cellular tower 104(a) places a voice communication request to a second user device 102(b). The request is routed to the core network 112, via backhaul 118. The core network 112 determines the location and the communication state of the second user device 102(b), and determines whether (1) the second user device 102(b) is reachable via a wireless communication link with cellular tower 104(a); (2) a wireless communication link with a Wi-Fi router 106; or (3) not reachable due to the user device's 102(b) inability to communicate with any wireless networks. Based on the communication state of the second user device, the call request may be routed by the core network 112 to the second user device 102(b) or to the voicemail system 114. If the call request is routed to the voicemail system 114, the system returns a voicemail greeting via the core network 112 to the first user device 102(a).

It may be appreciated that embodiments of the invention, such as those described with respect to the operating procedures of FIGS. 6-9 may be implemented in this example system architecture. For example, the operating procedures of FIGS. 6, 8, and 9 may be implemented in the core network 112, and the operating process of FIG. 7 may be implemented in the user device 102(a). Each of the processes is illustrated as a collection of operations, which represents a sequence of operations that can be implemented in hardware, software, or a combination thereof. In the context of software, the operations may represent computer-executable instructions that, when executed by one or more processors, perform the recited operations. Generally, computer-executable instructions may include routines, programs, objects, components, data structures, and the like that perform particular functions or implement particular abstract data types. The order in which the embodiments are implemented is not intended to be construed as a limitation, as there may be other orders of the depicted operations. It may further be appreciated that this example system architecture is an example, and embodiments of the invention may be implemented in other system architectures, such as one that contains more than the three cellular towers 104 that are depicted here, or one that contains multiple core networks 112, multiple voicemail systems 114, or multiple wireless routers 106.

Exemplary Hardware, Software and Communications Environment

Figure 2:
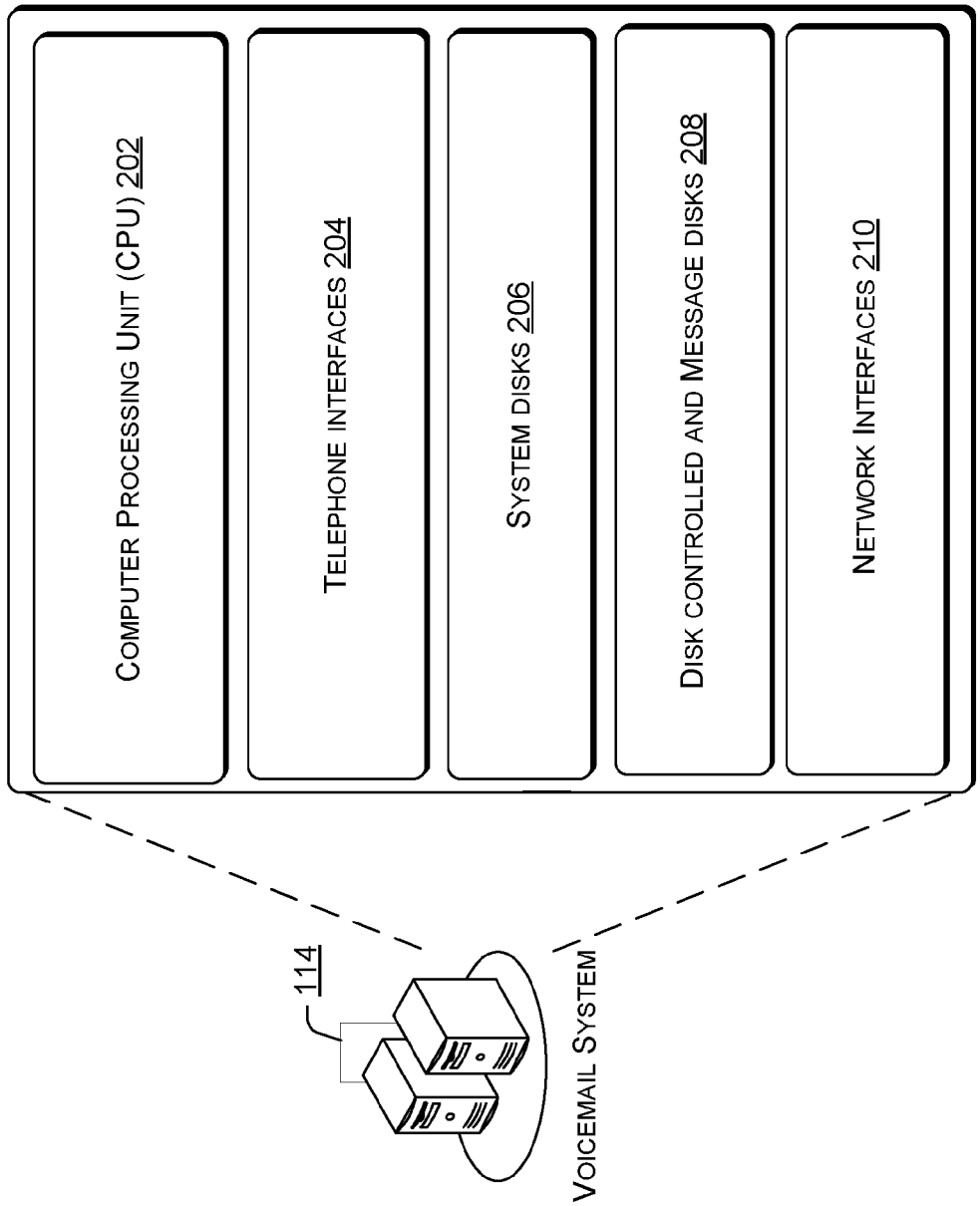
FIG. 2 is a diagram showing various components of an illustrative voicemail system.

FIG. 2 is a block diagram showing the various components of an illustrative computer system configured to execute processes that embodied in a voicemail system 114. The voicemail system 114 may include one or more central processing units (CPU) 202, telephone interfaces 204, system disks 206, disk controller and message disks 208, and a network interface 210.

In some embodiments, the CPU 202 may contain the operating system and software for the voicemail system that enables the core network 112 and the user to interact with the system by recording voicemail greetings and retrieving voicemail messages. The CPU 202 may be a single core processor, a multi core processor, or another type of processor. The processors may perform operation in parallel to process a continuous stream of data. The CPU 202 may also include network processors that manage speed communication interfaces, including interfaces that interact with peripheral components, such as memory disks, interfaces, and additional voicemail systems.

The telephone interfaces 204 may enable the CPU 202 to transmit and receive data from the core network 112 via a wired computer network connection, which may include a plurality of connections to allow multiple user account interactions with the system. The telephone interface 204 may detect communication request from the core network 112 and forward this request to the CPU 202 of the voicemail system 114.

The system disks 206 may contain the user directory with user preferences, such as voicemail greetings, extensions to voicemail message disks, and access passwords. In embodiments, the user may record multiple voicemail greetings to the system disks and may define the state for which the voicemail system 114 forwards the voicemail greeting to the user device 102(a) that submitted the call request. The system disks 206 may be implemented using computer readable media, such as computer storage media. Computer readable media includes at least two types of computer readable media, namely computer storage media and communications media. Computer storage media includes transitory and non-transitory, volatile and non-volatile, removable and non-removable media implemented in any method or technology for storage of information such as computer readable instructions, data structures, program operations, or other data. Computer storage media is sometimes referred to as computer-readable storage media. Computer storage media includes, but is not limited to random access memory (RAM), read-only memory (ROM), electrically erasable programmable read-only memory (EEPROM), flash memory, or other memory technology, compact disc read-only memory (CD-ROM) discs, digital versatile discs (DVD; sometimes also referred to as digital video discs), high definition video storage disks or other optical storage devices, or any other non-transmission medium that can be used to store information for access by a telephonic communication device. In contrast, communications media may embody computer readable instructions, data structures, program operations, or other data in a modulated data signal, such as carrier wave, or other transmission mechanism.

The disk controller and message disks 208 may contain the user accounts and the associated voicemails stored on their respective accounts. The type of storage device used for the disk controller and message disks 208 may be computer storage similar to the media defined and used for the system disks 206.

The network interface 210 may enable the voicemail system 114 to transmit and receive data via a wired connection to additional voicemail systems for additional system capacity to store voicemail user accounts and voicemails.

Example Communication States

Figure 3:
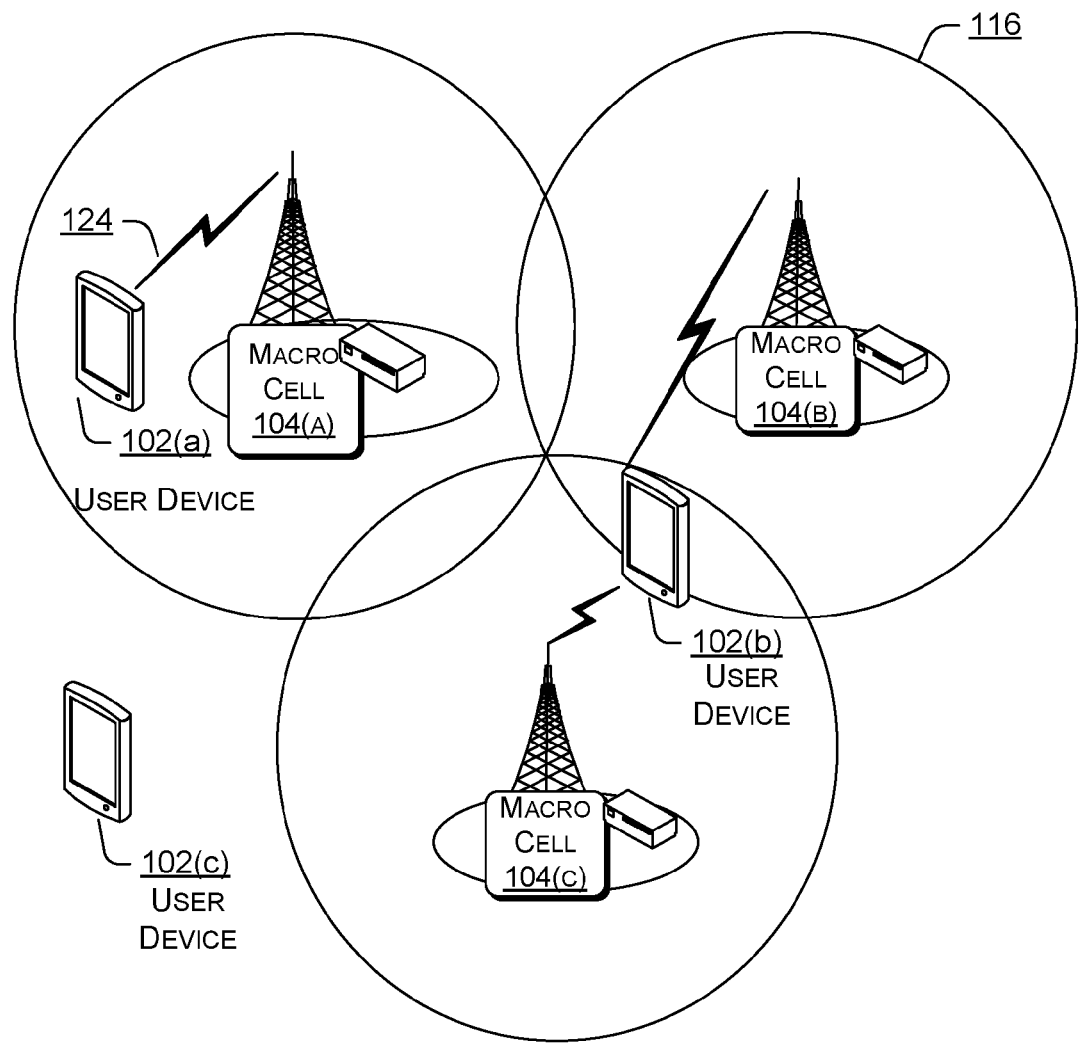
FIG. 3 illustrates an example of a user device in connectivity with cellular telephone towers.

FIG. 3 is a detailed partial representation of FIG. 1 showing the user device 102(a) communicatively connecting with the core network 112, through the group of cellular towers 104(a), 104(b), and 104(c). It can be noted that user device 102(a) has the ability to connect with cellular tower 104(a) while its position is within the area of cellular signal coverage 116 for cellular tower 104(a). The connectivity of the user device 102(a) to the cellular tower 104(a) is determined by the strength of the control signal 124. For example user device 102(b) is depicted in the area of coverage 116 of cellular tower 104(b) and 104(c), and during its movement within the space between the two cellular towers, the core network 112 transfers the user device 102(b) connectivity from the first cellular tower 104(b) to the second cellular tower 104(c) due to its greater control signal 124 strength quality with the user device 102(b). As depicted, user device 102(c) is outside of the area of cellular signal coverage 116, and does not have the ability to establish connectivity with the cellular network.

It can be a appreciated that the three cellular towers depicted in FIG. 3 may be represented by microcells, distributed antenna systems (DAS) or any other device that has the capability of connecting the user device 102 to the core network 112 to establish connectivity with the core network.

Figure 4:
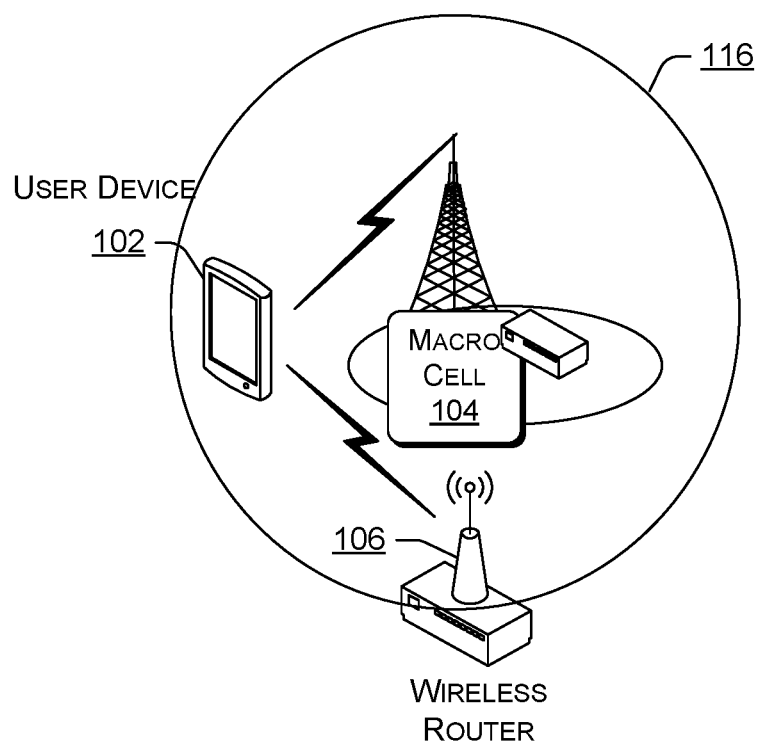
FIG. 4 illustrates an example of a user device in connectivity concurrently with a cellular tower and a wireless router.

FIG. 4 is a detailed representation of a section of FIG. 1 depicting user device 102 concurrently communicatively connected to both the cellular tower 104, and the wireless router 106. Connectivity to cellular tower 104 is accomplished via the control signal 124 and association with the wireless router 106 is achieved via the Wi-Fi signal 122. It may be established that in the condition shown, communication of the user device 102 with the core network 112 may be prioritized by the core network 112 or by the user to take effect on either the cellular or the Wi-Fi network.

For example, if the user device 102 is located in an area where the cellular signal 116 does not meet a minimum threshold, but the Wi-Fi signal 122 exceeds its minimum threshold, the user device 102 may be set to prioritize communication on the Wi-Fi network over the cellular network. Similarly, the user device 102 may be set to disregard the Wi-Fi signal 122 and establish communication with the cellular network exclusively via the control signal 124 emitted by the cellular towers 104.

Figure 5:
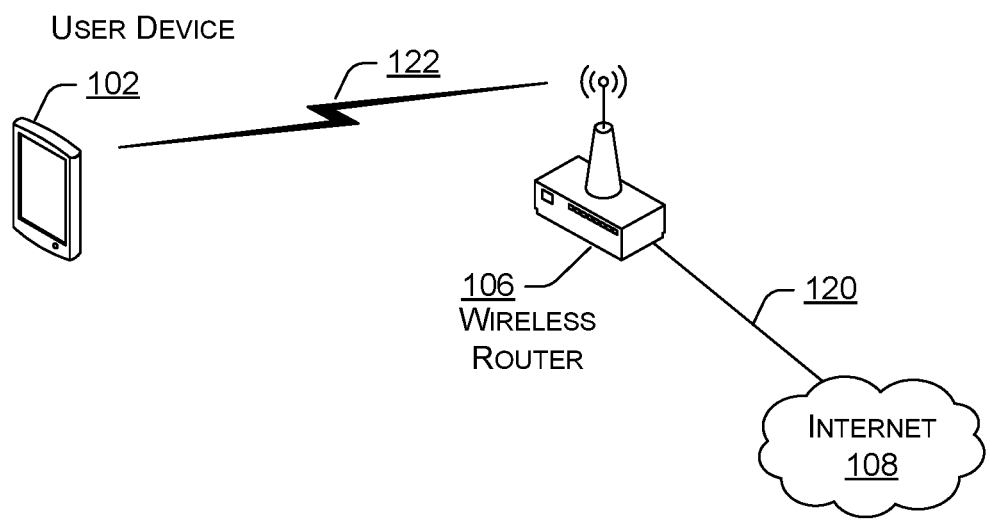
FIG. 5 illustrates an example of a user device in connectivity with a wireless router.

FIG. 5 is a partial view of FIG. 1 depicting a user device 102 communicatively connected to a wireless router 106 via the Wi-Fi signal 122. The packet data is transmitted to the core network 112, through the dedicated backhaul 118 to the Internet 108. The backhaul 118 may include a local area network (LAN), a larger network such as a wide area network (WAN), or any other wired or wireless backhaul connection. In a LAN or WAN system, a regular network gateway for data access, typically an Internet gateway is directly connected to both the wired LAN and Internet through which LAN users can connect and browse the Internet. The local network may be extended to a Wi-Fi wireless domain by wireless gateways or access points. The most commonly used wired LAN/WAN in a typical corporation, including most companies or home networks are Ethernet. However, any other digital network can be used such as asynchronous transfer mode (ATM) or fiber network as long as they can transmit data packets using standard protocol such as transmission control protocol/internet protocol (TCP/IP) and they communicate with the Wi-Fi network through access points. Furthermore, the wired interface can also be replaced by another wireless interface such as Global Standard for Mobile (GSM), Enhanced Data GSM Environment (EDGE), Code Division Multiple Access (CDMA), Long Term Evolution (LTE) or other cellular network interfaces that provides an alternative reliable connection.

Example Operating Procedures for Altering Voicemail Greeting Based on State

Figure 6:
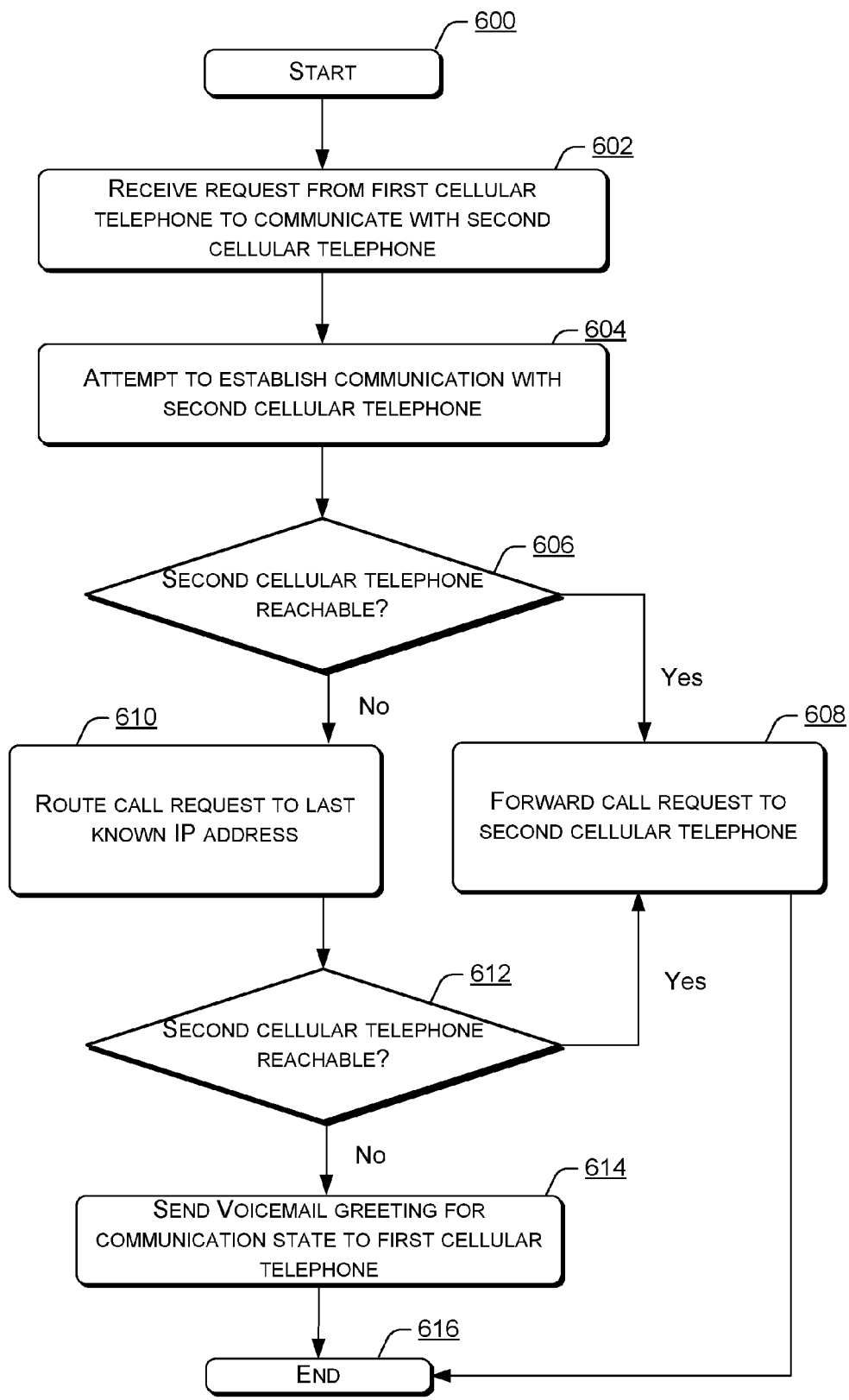
FIG. 6 depicts operating procedures for routing a call request from one user device to another and forwarding a voicemail greeting for a communication state to the calling user device.

FIG. 6 depicts operating procedures for implementing a communication session between two user devices 102, from the perspective of the core network 112, and starts at operation 600. In operation 602, a user device 102(a) may submit a request to the core network 100 for a communication session with a second user device 102(b). In operation 604, the system may attempt to establish communication with the second user device 102(b) through the cellular network. In operation 606, core network 112 may determine if the second user device 102(b) is reachable. Where the second user device is reachable, at operation 610, the request may be routed to the last known location of the second user device 102(b), which may be the last cellular tower 104 that the second user device 102(b) was connected via the control signal 124. If the location for the second user device 102(b) is determined, the communication session between the two user devices may be opened and call from the first user device 102(a) is forwarded 608 to the second user device 102(b). Alternatively, the core network 112 may try to establish the location of the second user device 104(b) via the Wi-Fi network.

At operation 610, the core network 112 may route the call request from the first user device 102(a) to the last known IP address that the second user device 102(b) was in communication with via the Wi-Fi signal 122. Thus, at operation 612, if the core network 112 determines that the second user device 104(b) is communicatively connected to the Wi-Fi network ("yes" at decision operation 612), the process may proceed to operation 608. Alternatively, the process may proceed to operation 614 ("no" at decision operation 612).

At operation 614, upon the system's inability to locate the second user device 102(b), the core network 112 may direct the call request to the voicemail system 114. In turn, the voicemail system 114 may relay the voicemail greeting of user device 102(b) for the predetermined communication status, to the first user device 102(A). The user of the device, or the core network 100 may define the communications state for the second user device 102(b). The set of criteria available for the user as a communication state for the second user device 102(b) may be the geolocation of the device or a period of time when all requests for communication with the user device 102(b) are blocked, as established by the user, and the connectivity state.

For example, it may be that the core network 100 may not reach the second user device 102(b) because user blocked all incoming requests for communication with user device 102(b) for a few hours. Thus, during that period, the voicemail system 114 may return a predetermined voicemail greeting recorded by the user associated with that state of communication.

Alternatively, the user device 102(b) may be located within the user's place of residence, but out of the user's reach. Upon a request for a communication session received from another user device 102(a), routed to the voicemail system 114 by the core network 100, the voicemail system 114 may return a different predetermined voicemail greeting specific to the state that the user device 102(b) is located in the user residence.

It may be appreciated that the operating procedures of FIG. 6 are illustrative and there may be embodiments that implement more or fewer operations than depicted here, or may implement the operation in a different order as depicted here. For example, in addition to cellular and Wi-Fi networks, the core network may check the user device's 102(b) connectivity to other wireless communication networks or there may multiple communications statues associated to voicemail greetings stored on the voicemail system 114 for the user device 102(b).

Figure 7:
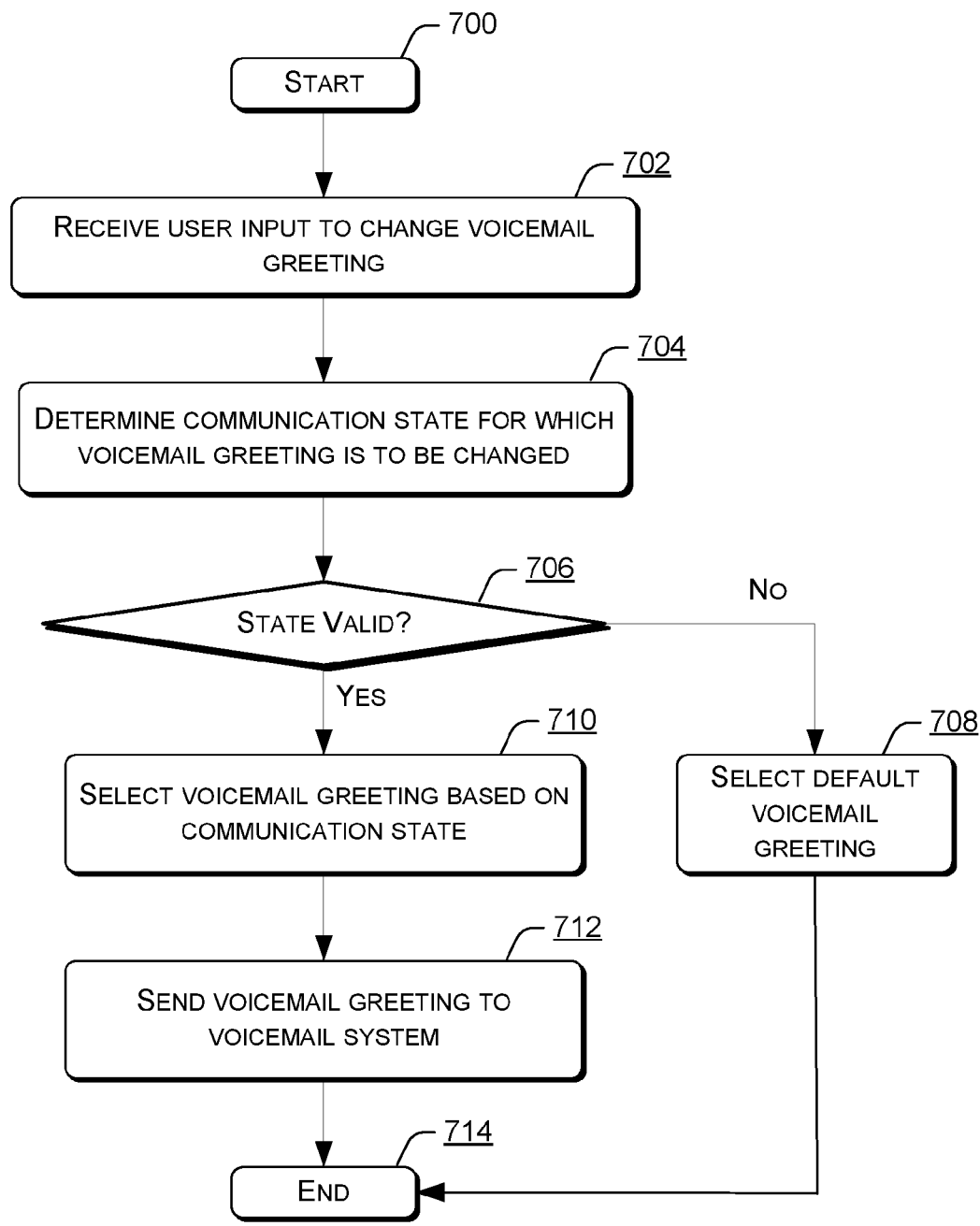
FIG. 7 depicts operating procedures for selecting a voicemail greeting for a communication state for the user device.

FIG. 7 illustrates example, operating procedures for recording a new voicemail greeting to the voicemail system 114 for a predetermined communication status. In embodiments, the flow diagram may involve the user device 102(b) being communicatively connected to the voicemail system 114 via Wi-Fi, or the cellular network. The operating procedures of FIG. 7 may be implemented from the point of view of the user device 102 and the process may start with operation 700. At operation 702, the user device 102 may receive a request to change an existing voicemail greeting or record a new voicemail greeting that is directed to the voicemail system 114. The process may involve the user device 102 being communicatively connected with the voicemail system 114 through the wireless signal from a cellular tower 104 or in embodiments, the user device 102 may be communicatively connected to the voicemail system 114 via the Wi-Fi signal 122 with a wireless router 106.

The implementation of operation 704 may involve the user providing user input to the user device indicative the state of communication for which the voicemail greeting is to be changed or recorded. The state of communication for the user device 102(*b*) may be transmitted to the voicemail system via voice or the keyboard of the user device 102(*b*). In other embodiments, the user may record a greeting in a visual voicemail application, and drag-and-drop the recorded message in a graphical user interface to indicate that it is the voicemail greeting to be selected.

In operation 706, the voicemail system 114 may determine the status of the voicemail greeting request that originated from the user device 102(*b*). The validity of the request may be determined by the voicemail system 114, based on a determination of the validity for the communication state. It may be appreciated that the communication conditions shown may be an example enumeration of the possible conditions available to the voicemail system 114 to choose from, and there may be other communications conditions for which the voicemail greetings may be stored. If the request is determined to be valid ("yes" in operation 706) the process proceeds to operation 710, otherwise ("no" in operation 706) the voicemail system 114 selects a default voicemail greeting in operation 708 that is assigned to the voicemail account associated with user device 102(*b*).

In operation 710, the voicemail system 114 may select, from a plurality of prerecorded voicemail greetings, the voicemail greeting associated with the valid communication state received from the user device 102(*b*). Alternatively, the user of the user device 102(*b*) may prerecord a new voicemail greeting and associate it to the validated communication state. In either case, the selected voicemail greeting that may be stored on the voicemail system disks is associated to the message account related to the user device 102(*b*).

The voicemail greetings may be stored as a file or a set of files on a magnetic disk, optical disc, or some other secondary storage device. The information in these files may be broken down into records, each of which may consist of one voicemail greeting. Voicemail greetings may also be organized into tables that include information about relationships between its communication states. The collection of voicemail greetings and communication states may involve crossreferencing so that one communication state relates to one voicemail greeting on the system.

In the embodiment of operation 712, the selected voicemail greeting may be addressed to the user device 102(*b*) extension located on the voicemail system 114 message disks. The voicemail greeting direction from the system disks to the user device 102(*b*) extension, stored on the message disks, may occur as a transfer of the greeting to the extension associated to the user device 102(*b*), or it may be a transfer of a voicemail greeting address to such extension. As such, the voicemail greeting associated with the extension is recalled when a call request is directed to the voicemail system 114 extension by the core network 112. The extension may store one or a plurality of voicemail greetings associated to a range of valid communication states linked to the user device 102(*b*).

Figure 8:
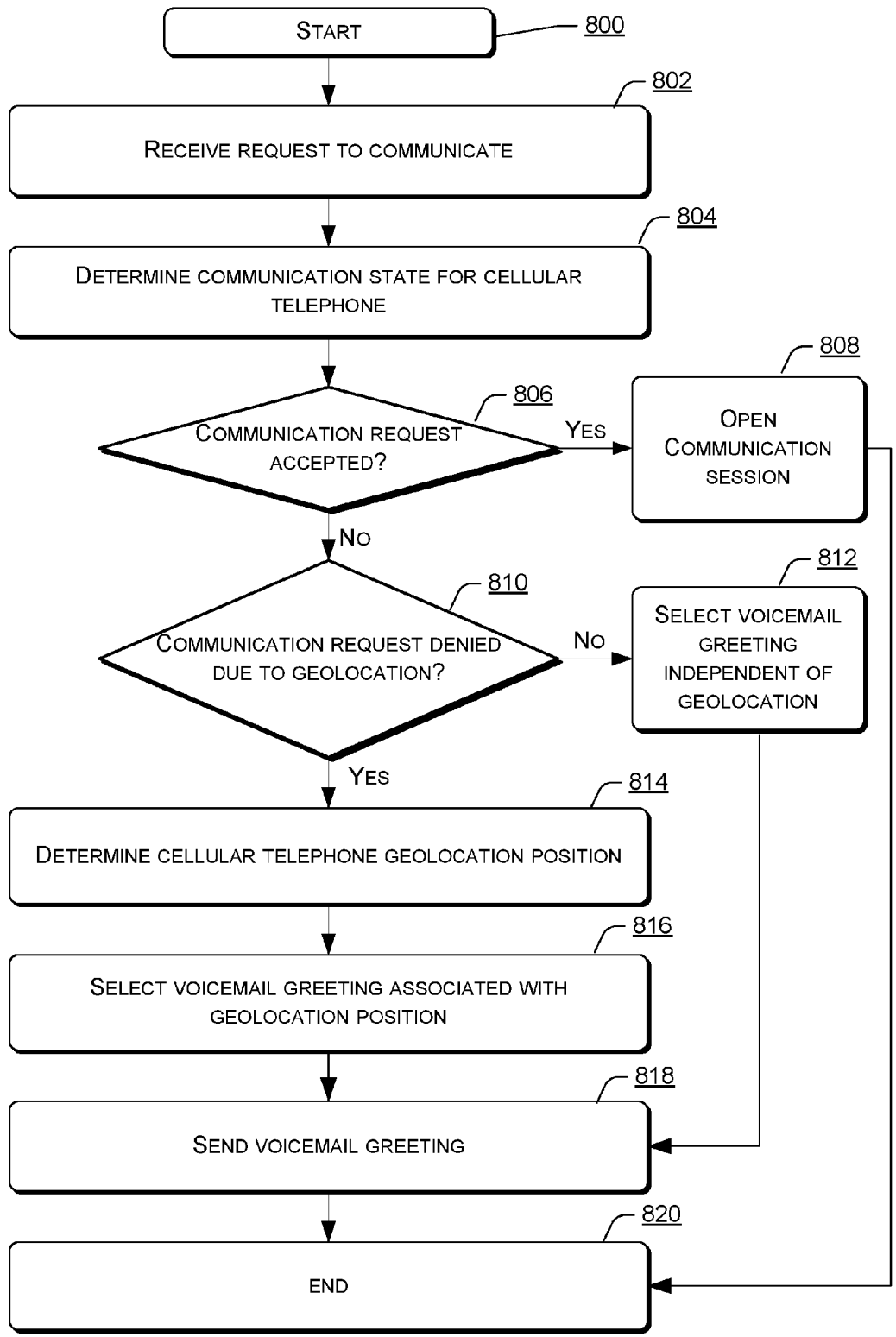
FIG. 8 depicts operating procedures for sending a voicemail greeting when the communication state is the geolocation of the user device.

FIG. 8 depicts example operating procedures for determining a communication status that is associated with a voicemail greeting based on a geolocation of a user device. It may be understood that the geolocation of the user device 102(*b*) is an attribute dependent on the user device's connection with a cellular tower 104, the location of the Wi-Fi signal 106 that the user device 102(*b*) is connected to, or the Global Positioning System (GPS) defined by the device. The identification of the real world geographic location of the user device, which may be a state that defines the communication state of the user device 102(*b*) is a condition defined by the device. The user device 102(*b*) communicates with the core network to convey its status to the voicemail system 114, for the system to select the valid voicemail greeting.

The process starts in operation 800, when the second user device 102(*b*) receives a request to communicate from the first user device 102(*a*), via a connection determined by the core network 112. The call request may be sent while the user device 102(*b*) may be communicatively linked with the core network via a cellular tower or a Wi-Fi signal. The call request is processed by the user device 102(*b*) by comparing it to its predetermined communication state, as shown in operation 804.

In operation 806, the user device 102(*b*) acts on the received call request by accepting it ("yes" in operation 806), or rejecting it ("no" in operation 806). If the call request is accepted the process is routed to operation 808, where the communication session is acceded and the communication link between the two user devices is initiated.

If, instead, the call request is rejected, the user device 102(*b*) determines its communication status from a plurality of statuses preprogrammed into the device. In operation 810, the user device 102(*b*) may analyze its preprogrammed communication statuses to determine if its geolocation is a valid communication status condition ("yes" in operation 810) that involves the process proceeding to operation 814. Furthermore, geolocation may not the governing condition for the decline of the call request ("no" in operation 810), in which case the voicemail greeting selected for the communication status, in operation 812, is independent of the geolocation factor.

In the state where the communication status of the user device 102(*b*) is dependent on the geolocation of the device ("no" in operation 810), the process proceeds to operation 814, where the device 102(*b*) acquires its location and transmits it to the voicemail system 114. The geolocation may be determined by the GPS coordinates of the device, the communication link with a cellular tower 104 that has a defined location, or the address of the wireless router that is linked to the user device 102(*b*). The geolocation may be relayed back to the voicemail system 114 for additional determinations and greeting selection.

In operation 816, the voicemail system selects the voicemail greeting, from a plurality of voicemail greetings assigned to user device 102(*b*) extension on the voicemail system 114 that satisfies the location coordinates of the user device 102(*b*). The extension may contain several voicemail greetings that are associated to different geolocation points. For example, a voicemail greeting may be associated with a condition when the user device is located at "home," while a separate voicemail greeting may be selected when the geolocation of the user device is "at work."

Finally, in operation 820 the voicemail greeting is sent to the first user device 102(*a*).

As opposed to the communication state being defined by the user device 102(*b*), in certain embodiments the core network 112 may determine the communications status for the device. It may be appreciated that in these embodiments, the communication status for the user device 102(b) may be determined by other systems in the core network 100 and communication with the user device 102(b) is not a condition that defines the status. For example, if the user device 102(b) is outside the area of coverage 116, and not communicatively linked to any wireless communication systems, the core network 112 may direct the call request to the voicemail system 114. Furthermore, if the user device 102 (b) is blocked from receiving call requests for a period of time, these embodiments may not involve communication with the device to determine communication status, and the call may be routed to the voicemail system 114 extension associated with the device.

Figure 9:
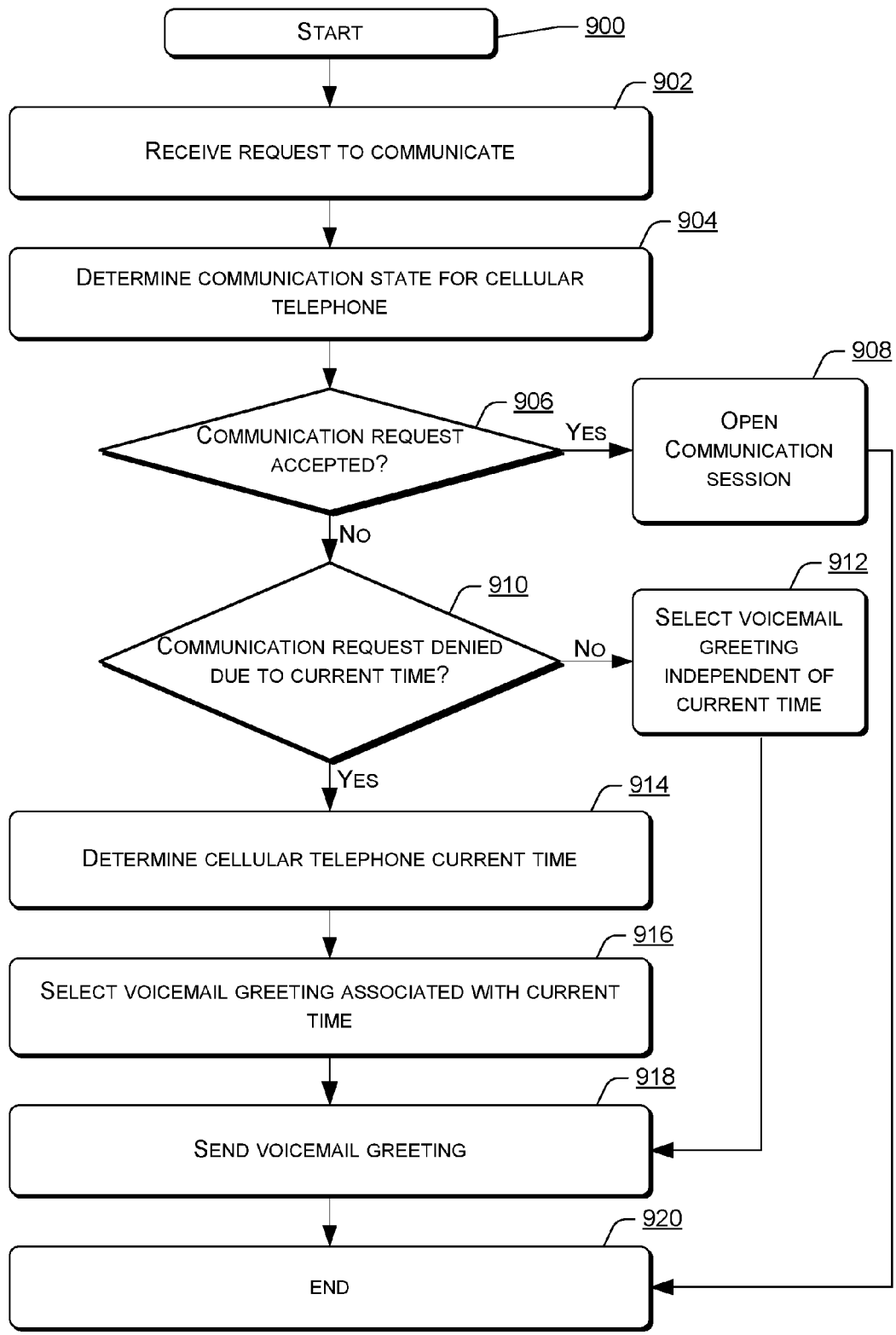
FIG. 9 depicts operating procedures for sending a voicemail greeting when the communication state is when the user device is blocked from receiving call requests for a period of time.

The process for determining the communication status of the user device 102(b) may be a conditional upon a request by the user device to operation all call requests for a period of time, as shown in FIG. 9. The process is depicted from the point of view of the user device 102(b), but the core network 112 or any other system in the core network may also implement it. The process commences in operation 900.

In operation 902, the second user device 102(b) may receive a communication request from the first user device 102(a), via the core network 112. The user devices may be communicatively linked to cellular towers 104 in the cellular network or linked to wireless routers via Wi-Fi.

In operation 904, the user device 102(b) is in receipt of the call request and in process of determining its communication status. The call request may be accepted or denied based on the communication status and the decision is performed in operation 906. If the call request is accepted ("yes" in operation 906) the process proceeds to operation 908 where the communication with the first user device 102(a) is activated and the process is routed to operation 920 for closure of the procedure. With a negative assertion ("no" in operation 906), the user device 102(b) determines and defines its communication status for which the call request is rejected.

In operation 910, as the call request is denied, the communication status for which the user device 102(b) is unavailable is determined. The condition may be defined by one of a plurality of communication statuses, but if the condition refers to the user device 102(b) being blocked for a period of time ("yes" in logical operation 910), the process is directed to operation 914. Alternatively, if the condition is defined as anything other than the user device 102(b) blocked for a period of time ("no" in logical operation 910, the voicemail greeting selected in operation 912 is independent of the time operation condition.

It may be appreciated that the illustrative embodiment may not involve the core network 112 to route the call request to the user device 102(b), but the communication status for the user device 102(b) may be stored in the core network 112 or any other system of the core network.

In operation 914, the user device may record the time and route this value to the voicemail system 114 for the corresponding voicemail greeting to be selected. For example, the user of the user device 102(b) may select a voicemail greeting for the 9:00 AM and 5:00 PM time period, and select an alternate voicemail greeting for the 5:00 PM and 9:00 PM time period.

Upon receipt of the time record from the user device 102(b), in operation 916, the voicemail system may select the voicemail greeting associated with the communication status validated by the user device 102(b). The voicemail greeting may be stored in the voicemail extension on the voicemail system 114 message disks, or may be stored on the system disks and associated to the voicemail extension.

Lastly, the voicemail system 114 transmits the valid voicemail greeting to the first user device 102(a).

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
a processor; and
a memory communicatively coupled to the processor, the memory bearing computer-executable instructions that, upon execution by the processor, cause the system at least to:
receive an incoming call from a first telephone that is directed to a second cellular telephone;
select, as a selected outgoing voicemail greeting, a first outgoing voicemail greeting from a plurality of outgoing voice greetings in response to determining that the second cellular telephone is in a first communication state of being reachable by a core network via at least a cellular connection;
select, as the selected outgoing voicemail greeting, a second outgoing voicemail greeting from a plurality of outgoing voicemail greetings in response to determining that the second cellular telephone is in a second communication state of being reachable by the core network via a Wi-Fi connection without being reachable via the cellular connection;
select, as the selected outgoing voicemail greeting, a third outgoing voicemail greeting from a plurality of outgoing voicemail greetings in response to determining the second cellular telephone is in a third communication state of being not reachable by the core network; and send the selected outgoing voicemail greeting to the first telephone.

2. The system of claim 1, wherein the memory further bears computer-executable instructions that, upon execution by the processor, cause the system at least to:
connect the second cellular telephone to the system to register an outgoing voicemail greeting for a communication state; and
update an association between the outgoing voicemail greeting for the communication state and the communication state.

3. The system of claim 2, wherein the memory further bears computer-executable instructions that, upon execution by the processor, cause the system at least to:
connect the second cellular telephone to the system to register an alternative outgoing voicemail greeting for a communication state; and
update an association between the alternative outgoing voicemail greeting for the communication state and the communication state.

4. The system of claim 1, wherein the memory further bears computer-executable instructions that, upon execution by the processor, cause the system at least to:
determine a communication state of the second cellular telephone before receiving the incoming call.

5. The system of claim 1, wherein the memory further bears computer-executable instructions that, upon execution by the processor, cause the system at least to:
 determine a communication state of the second cellular telephone based on a signal strength of a cellular tower control channel.

6. The system of claim 1, wherein the memory further bears computer-executable instructions that, upon execution by the processor, cause the system at least to:
 determine a communication state of the second cellular telephone based on a Wi-Fi router Internet Protocol (IP) address.

7. The system of claim 1, wherein the memory further bears computer-executable instructions that, upon execution by the processor, cause the system at least to:
 determine a communication state of the second cellular telephone based on the second cellular telephone currently being set not to connect to any wireless systems.

8. A computer-implemented method, comprising:
 determining a geolocation of a first cellular telephone that is receiving a call request from a second telephone based on an Internet Protocol (IP) address that the first cellular telephone is using to communicate with a core network, the IP address being assigned to a Wi-Fi router that is communicating with the first cellular telephone
 determining a communication state of the first cellular telephone based on the geolocation of the first cellular telephone, the communication state being a first communication state in which the first cellular telephone is at a place of residence or a second communication state in which the first cellular telephone is at a place of work; selecting, a voicemail greeting indicating that the second telephone is reachable by the core network via a Wi-Fi connection without being reachable via the cellular connection;
 and selecting the predetermined voicemail greeting from a plurality of predetermined voicemail greetings based on the communication state of the first cellular telephone, the predetermined voicemail greeting indicating the first cellular telephone as being at the place of residence or at the place of work; and sending the predetermined voicemail greeting to the second telephone.

9. The computer-implemented method of claim 8, wherein the determining the geolocation includes determining the geolocation of the first cellular telephone via a primary cellular tower that is communicating with the first cellular telephone.

10. The computer-implemented method of claim 9, wherein the geolocation of the first cellular telephone is determined based on a signal strength of a control channel of the primary cellular tower.

11. The computer-implemented method of claim 8, wherein the plurality of predetermined voicemail greetings are provided by a user.

12. A computer-implemented method, comprising:
 receiving, by a server, an incoming synchronous communication from a first telephonic communication device that is directed to a second telephonic communication device;
 determining, by the server, a communications state for the second telephonic communication device, the communication state being one of reachable by a core network via at least a first communication protocol, reachable by the core network via a second communication protocol without being reachable via the first communication protocol, and not reachable by the core network, wherein the first communication protocol is associated with cellular communication and the second communication protocol is associated with Wi-Fi communication;
 selecting, by the server, a voicemail greeting indicating that a user of the second telephonic communication device is reachable by the core network via the second communication protocol without being reachable via the first communication protocol from a plurality of voicemail greeting based on the determined communication state of the second telephonic communication device; and
 sending, by the server, the voicemail greeting to the first telephonic communication device.

13. The computer-implemented method of claim 12, wherein the determining the communications state for the second telephonic communication device comprises:
 determining the communications state based on an user input received from the second telephonic communication device.

14. The computer-implemented method of claim 12, wherein the determining the communications state for the second telephonic communication device comprises:
 determining the communications state based on a geolocation of the second telephonic communication device.

15. The computer-implemented method of claim 14, wherein the determining the communications state based on the geolocation of the second telephonic communication device comprises:
 determining the geolocation based on a Wi-Fi network Internet Protocol (IP) address associated with the second telephonic communication device.

16. The computer-implemented method of claim 14, wherein the determining the communications state based on the geolocation of the second telephonic communication device comprises:
 determining the geolocation based on a control channel signal strength of a cellular tower communicating with the second telephonic communication device.

17. The computer-implemented method of claim 12, wherein the determining the communications state for the second telephonic communication device comprises:
 determining the communications state for the second telephonic communication device based on whether the incoming synchronous communication falls within a predetermined period of time.

\* \* \* \* \*